United States Patent
Li

(10) Patent No.: US 9,899,843 B2
(45) Date of Patent: Feb. 20, 2018

(54) ENERGY STORAGE SYSTEM WITH RANGE EXTENDER AND ENERGY MANAGEMENT AND CONTROL METHOD

(71) Applicant: GENERAL ELECTRIC COMPANY, Schenectady, NY (US)

(72) Inventor: Fei Li, Shanghai (CN)

(73) Assignee: GENERAL ELECTRIC COMPANY, Fairfield, CT (US)

( * ) Notice: Subject to any disclaimer, the term of this patent is extended or adjusted under 35 U.S.C. 154(b) by 106 days.

(21) Appl. No.: 15/087,400

(22) Filed: Mar. 31, 2016

(65) Prior Publication Data
US 2016/0294190 A1 Oct. 6, 2016

(30) Foreign Application Priority Data

Mar. 31, 2015 (CN) .......................... 2015 1 0148686

(51) Int. Cl.
*H02J 1/00* (2006.01)
*H02J 3/00* (2006.01)
(Continued)

(52) U.S. Cl.
CPC ............ *H02J 3/383* (2013.01); *B60L 3/0046* (2013.01); *B60L 3/0084* (2013.01);
(Continued)

(58) Field of Classification Search
USPC .............................................. 307/64, 65, 80
See application file for complete search history.

(56) References Cited

U.S. PATENT DOCUMENTS 5,264,764 A    11/1993  Kuang
5,318,142 A    6/1994   Bates et al.
(Continued)

FOREIGN PATENT DOCUMENTS

CN    101896373 A    11/2010
CN    102005810 A    4/2011
(Continued)

OTHER PUBLICATIONS

Haifeng et al., "A Study on Lead Acid Battery and Ultra-capacitor Hybrid Energy Storage System or Hybrid City Bus", International Conference on Optoelectronics and Image Processing, IEEE Computer Society, pp. 154-159, vol. 1, Nov. 2010.
(Continued)

*Primary Examiner* — Adam Houston
(74) *Attorney, Agent, or Firm* — Meagher Emanuel Laks; Goldberg & Liao, LLP.

(57) ABSTRACT

A system comprises a first energy system, a range extender, and a controller. The range extender has a second energy system, first and second converters, and a by-pass. The first converter is selectably coupled between the first energy system and an electric load, the second converter is selectably coupled between the second energy system and at least one of an output side of the first converter and an input side of the electric load, and the by-pass is selectably coupled between the first energy system and at least one of the output side of the first converter, an output side of the second converter and the input side of the electric load.

19 Claims, 5 Drawing Sheets

(51) Int. Cl.
*H02J 3/38* (2006.01)
*B60L 3/00* (2006.01)
*B60L 11/12* (2006.01)
*H02J 9/00* (2006.01)
*H02M 3/158* (2006.01)

(52) U.S. Cl.
CPC ............ *B60L 11/123* (2013.01); *H02J 3/387* (2013.01); *H02J 9/00* (2013.01); *H02M 3/158* (2013.01); *Y02T 10/6217* (2013.01); *Y02T 10/7077* (2013.01)

(56) References Cited

U.S. PATENT DOCUMENTS

| | | | |
|---|---|---|---|
| 7,595,597 | B2 | 9/2009 | King et al. |
| 7,633,271 | B2 | 12/2009 | Schulte et al. |
| 8,120,290 | B2 | 2/2012 | King |
| 8,245,801 | B2 | 8/2012 | Flett |
| 8,342,272 | B2 | 1/2013 | Gee |
| 8,378,623 | B2 | 2/2013 | Kusch et al. |
| 8,511,407 | B2 | 8/2013 | Jeon et al. |
| 8,818,601 | B1 | 8/2014 | G V et al. |
| 8,836,251 | B2 | 9/2014 | Tabatabaei |
| 2007/0158118 | A1 | 7/2007 | King |
| 2010/0149840 | A1* | 6/2010 | Hayasaki ............ H02M 3/3381 363/21.09 |
| 2010/0239303 | A1* | 9/2010 | Matsumoto ........... H02M 3/156 399/88 |
| 2011/0100735 | A1 | 5/2011 | Flett |
| 2011/0115288 | A1 | 5/2011 | Lee |
| 2012/0025768 | A1 | 2/2012 | Nakano et al. |
| 2012/0072066 | A1* | 3/2012 | Kato ........ B60K 6/365 701/22 |
| 2012/0175967 | A1* | 7/2012 | Dibben ................. H02J 5/005 307/104 |
| 2012/0200152 | A1 | 8/2012 | Schneider et al. |
| 2012/0228944 | A1* | 9/2012 | Koshin ................ H01M 10/44 307/66 |
| 2012/0255799 | A1 | 10/2012 | Kohler et al. |
| 2013/0038249 | A1 | 2/2013 | Tabatabaei |
| 2013/0307489 | A1 | 11/2013 | Kusch et al. |
| 2014/0244082 | A1 | 8/2014 | Caron |
| 2014/0375125 | A1* | 12/2014 | Ye .............................. H02J 3/24 307/26 |
| 2015/0180273 | A1* | 6/2015 | Wagoner .................. H02M 1/12 290/50 |
| 2015/0263542 | A1* | 9/2015 | Sato ........................ H02J 7/007 363/21.12 |
| 2016/0009354 | A1* | 1/2016 | Lai ............................ B63J 3/00 307/9.1 |
| 2016/0031391 | A1* | 2/2016 | Dong .................... B60R 16/023 307/9.1 |
| 2016/0082907 | A1* | 3/2016 | Dong ........................ B63J 3/00 307/9.1 |
| 2016/0294182 | A1* | 10/2016 | Li .............................. H02J 1/00 |

FOREIGN PATENT DOCUMENTS

| | | |
|---|---|---|
| CN | 102700432 B | 9/2014 |
| DE | 102010008917 A1 | 8/2011 |
| EP | 2226215 A1 | 9/2010 |
| EP | 2353925 A2 | 8/2011 |
| WO | WO2009078328 A1 | 6/2009 |
| WO | WO2012067757 A1 | 5/2012 |
| WO | 2013102784 A1 | 7/2013 |
| WO | 2014091238 A2 | 6/2014 |
| WO | 2014209377 A1 | 12/2014 |

OTHER PUBLICATIONS

European Search Report and Written Opinion issued in connection with related EP Application No. 16162905.0-1807 dated Sep. 8, 2016.

European Search Report and Written Opinion issued in connection with corresponding EP Application No. 16162903.5-1807 dated Sep. 8, 2016.

First Office issued in connection with corresponding CN Application No. 201510148636 dated Dec. 4, 2017.

First Office Action and Search issued in connection with corresponding CN Application No. 201510148732.X dated Dec. 4, 2017.

First Office issued in connection with corresponding MX Application No. MX/a/2016/004109 dated Oct. 25, 2017.

\* cited by examiner

ENERGY STORAGE SYSTEM WITH RANGE EXTENDER AND ENERGY MANAGEMENT AND CONTROL METHOD

CROSS REFERENCE TO RELATED APPLICATIONS

The present application claims foreign priority benefit under 35 U.S.C. § 119 to commonly-owned Chinese Patent Application No. 201510148686.3 filed 31 Mar. 2015, which is hereby incorporated by reference in its entirety.

The present application also relates to commonly owned Chinese Patent Application No. 201510148732.X filed Mar. 31, 2015 entitled "MULTI-SOURCE ENERGY STORAGE SYSTEM AND ENERGY MANAGEMENT AND CONTROL METHOD" which is hereby incorporated by reference in its entirety.

FIELD OF THE INVENTION

The present invention relates to an energy storage system and an energy management and control method for a power system mainly used for vehicle driving and the like, and particularly to an energy storage system with a range extender and an energy management and control method.

BACKGROUND OF THE INVENTION

When the problem of pollution is becoming more and more serious, electric vehicles and renewable energies are becoming more and more attractive. A pure electric vehicle supplies power to its electric motor using the stored electric energy to drive the vehicle. The pure electric vehicle may use one or more stored electric energy sources. For example, a first electric energy storage source, for example, an energy battery, may be used to supply longer sustaining energy, and a second electric energy storage source, for example, a power battery may be used to supply higher power energy, for e.g., accelerating the vehicle, and so on. A hybrid electric vehicle may combine an internal-combustion engine with an electric motor powered by an energy storage device (such as a traction battery) to drive the vehicle. Such combination may improve the total fuel efficiency by enabling the internal-combustion engine and the electric motor to operate in their respective higher efficiency ranges. For example, the electric motor may have a higher efficiency when starting to accelerate from a stationary state, and the internal-combustion engine may have a higher efficiency during constant engine running (such as running on a highway). Allowing the electric motor to increase the initial acceleration enables the internal-combustion engine in the hybrid vehicle to be smaller and to have a higher fuel efficiency.

In pure electric vehicles supplied by batteries and plug-in hybrid electric vehicles, high energy density batteries can meet the mileage demand with a single charge, if the sizes of the high energy density batteries are properly configured. However, the high energy density batteries of the same size, due to their relatively low power density, may be unable to meet the power demand caused by instantaneous acceleration or climbing, especially in heavy duty applications, which, for example, is particularly obvious in a city bus or truck. To this end, a plurality of energy sources or hybrid energy sources may be used to meet the mileage demand and power demand of the vehicle simultaneously, without needing to increase the size of a single high energy density battery excessively. In the heavy duty electric vehicles, the combination of the high energy density batteries and power batteries may be used as the hybrid energy source, because such kind of power batteries have high power density and longer lifetime. However, when a plurality of energy sources or hybrid energy sources are introduced into the vehicle driving system, the configuration and control between the plurality of energy sources or hybrid energy sources become complicated. A problem to be solved in the industry is how to properly configure and control the plurality of energy sources or hybrid energy sources to enable the vehicle driving system to run efficiently to deal with all kinds of working conditions, and to ensure the security of the entire energy source power supply system and electric vehicle.

Accordingly, it is necessary to provide a system and a method for solving at least one of the problems as mentioned above.

SUMMARY OF THE INVENTION

One aspect of the present invention is to provide an energy storage system, comprising: a first energy storage system and a range extender between the first energy storage system and an electric load. The range extender comprises a first DC-to-DC converter, a second energy storage system, a second DC-to-DC converter, and a by-pass. Specifically, the first DC-to-DC converter is selectably coupled between the first energy storage system and the electric load, the second DC-to-DC converter is selectably coupled between the second energy storage system and at least one of an output side of the first DC-to-DC converter and an input side of the electric load, the by-pass is selectably coupled between the first energy storage system and at least one of the output side of the first DC-to-DC converter, an output side of the second DC-to-DC converter and the input side of the electric load. The energy storage system further comprises a controller configured to control the first energy storage system and the range extender to work in at least one of a normal operation mode and a fault protection mode, in the normal operation mode, the first and second energy storage systems are parallel coupled to the electric load through the first and second DC-to-DC converters, respectively, and in the fault protection mode, the first energy storage system is coupled to the electric load through the by-pass, and the second energy storage system is decoupled from the electric load.

Another aspect of the present invention is to provide a method, comprising:

operating an energy storage system comprising a first energy storage system, a first DC-to-DC converter, a by-pass parallel to the first DC-to-DC converter, a second energy storage system and a second DC-to-DC converter in a normal operation mode, comprising parallel powering an electric load by the first and second energy storage systems through the first and second DC-to-DC converters respectively; and operating the energy storage system in a fault protection mode when a fault is detected in any of the second energy storage system and the first and second DC-to-DC converters, comprising powering the electric load by the first energy storage system through the by-pass and decoupling the second energy storage system from the electric load.

With the energy storage system and energy management and control method of the present invention, the range extender is provided between the main energy storage system and the electric load, and one or more auxiliary energy storage systems may be added to supply energy for the electric load, such as a vehicle driving system and the like, to meet the various power demands of the electric load to enable it to run in different working conditions. Besides, such manner does not need to make large changes to the hardware or software of the entire system. In addition, the energy storage system solves the problem that the electric load may lose power and stop working immediately once the range extender goes wrong, to ensure that the electric load can still operate normally even if the range extender goes wrong, thereby improving the security.

BRIEF DESCRIPTION OF THE DRAWINGS

These and other features, aspects and advantages of the present invention can be understood better in light of the following detailed description with reference to the accompanying drawings, in which the same reference signs represent the same components in the whole drawings, in which:

FIGS. 2 and 3 are schematic circuit diagrams of one specific embodiment of the energy storage system shown in FIG. 1, wherein FIG. 2 illustrates a state of the energy storage system in the normal operation mode, FIG. 3 illustrates a state of the energy storage system in the fault protection mode.

DETAILED DESCRIPTION

In order to help the person skilled in the art to exactly understand the subject matters claimed by the present invention, detailed description for embodiments of the present invention will be given with reference to the accompanying drawings in the following. In the following detailed description for those embodiments, some known functions or structures will not be described in details by the Description, to avoid disclosure of the present invention to be affected by unnecessary details.

Unless defined otherwise, the technical or scientific terms used in the Claims and the Description should have meanings as commonly understood by one of ordinary skilled in the art to which the present disclosure belongs. The terms "first", "second" and the like in the Description and the Claims do not mean any sequential order, quantity or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, but may comprise electric connection, no matter directly or indirectly.

One aspect of embodiments of the present invention relates to an energy storage system for supplying power to the electric load that may be applied to the fields of electric vehicles, smart power grids, microgrid, solar energy, wind power, and so on. The energy storage system comprises a first energy storage system for supplying power to the electric load and a range extender system for supplying supplementary power to the electric load. The range extender system comprises at least one second energy storage system, and further comprises a DC-to-DC converter and a by-pass in parallel with the DC-to-DC converter, which may ensure that the electric load operates normally when a fault occurs.

Figure 1:
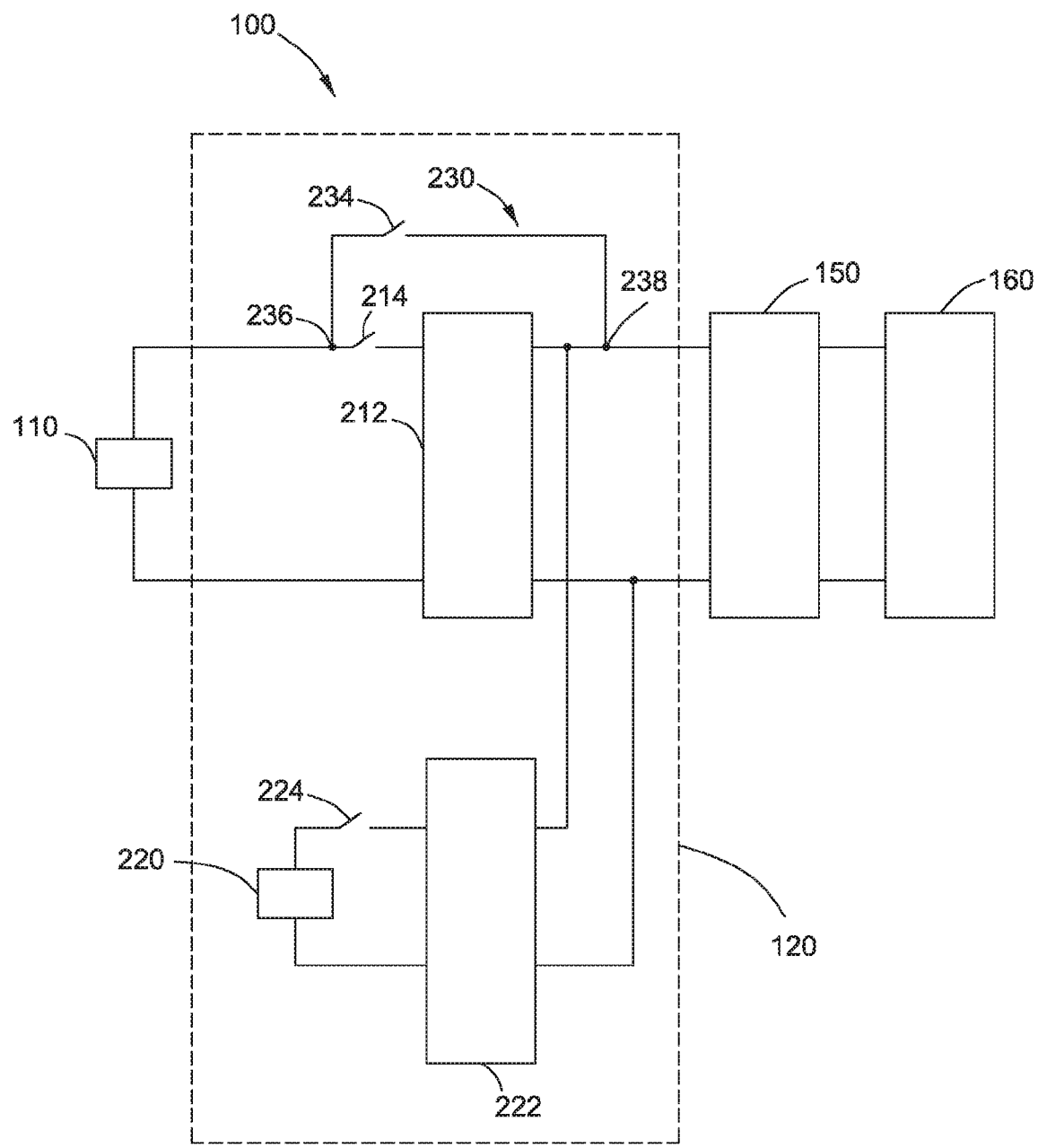
FIG. 1 is a schematic block diagram of an energy storage system according to one embodiment of the present invention.

FIG. 1 shows a schematic block diagram of an energy storage system according to one embodiment of the present invention. Referring to FIG. 1, the energy storage system 100 comprises a first energy storage system 110 for supplying power to an electric load 160 and a range extender 120 between the first energy storage system 110 and the electric load 160. Specifically, the range extender 120 comprises a second energy storage system 220, a first DC-to-DC converter 212, a second DC-to-DC converter 222, and a by-pass 230 in parallel with the first DC-to-DC converter 212.

The first energy storage system 110 and the second energy storage system 220 are selectably coupled to the electric load 160 through the first DC-to-DC converter 212 and the second DC-to-DC converter 222, respectively. The first DC-to-DC converter 212 and the second DC-to-DC converter 222 are also coupled with each other. In particular, one side of the first DC-to-DC converter 212 is coupled to the first energy storage system 110, and the other side of the first DC-to-DC converter 212 is coupled to the second DC-to-DC converter 222 and the electric load 160 through a node between the second DC-to-DC converter 222 and the electric load 160, one side of the second DC-to-DC converter 222 is coupled to the second energy storage system 220, and the other side of the second DC-to-DC converter 222 is coupled to the first DC-to-DC converter 212 and the electric load 160 through a node between the first DC-to-DC converter 212 and the electric load 160. A first switch device 214 is connected between the first energy storage system 110 and the first DC-to-DC converter 212, and a second switch device 224 is connected between the second energy storage system 220 and the second DC-to-DC converter 222.

The first energy storage system 110 may be coupled to the node between the second DC-to-DC converter 222 and the electric load 160 without passing by the first DC-to-DC converter 212 by the by-pass 230 in parallel with the first DC-to-DC converter 212, thereby coupling the first energy storage system 110 to the second energy storage system 220 through the second DC-to-DC converter 222 or coupling the first energy storage system 110 to the electric load 160 directly. In the specific embodiment shown in FIG. 1, the by-pass 230 is connected with a first node 236 between the first energy storage system 110 and the first DC-to-DC converter 212 and a second node 238 between the first and second DC-to-DC converters 212 and 222 and the electric load 160. The by-pass 230 may comprise a switch device (third switch device) 234. The resistance of the by-pass 230 may be negligible, compared with the converter 212 or 222. In one specific embodiment, the by-pass 230 only comprises the switch device 234 without other elements of larger resistance. In this way, the energy loss may be minimized if the second energy storage system 220 is charged by the first energy storage system 110 through the by-pass 230.

The energy storage system 100 further comprises a controller 150 used to control the energy storage systems 110 and 220, the converters 212 and 222 and the by-pass 230 to work in at least one of a normal operation mode and a fault protection mode. In the normal operation mode, the first and second energy storage systems 110 and 220 are parallel coupled to the electric load 160 through the first and second DC-to-DC converters 212 and 222, respectively. When a fault is detected in any of the second energy storage system 220, the first DC-to-DC converter 212 and the second DC-to-DC converter 222, the fault protection mode may be initiated, disabling the second energy storage system 220, the first DC-to-DC converter 212 and the second DC-to-DC converter 222, while only powering the electric load 160 by the first energy storage system 110 directly. In the fault protection mode, the first energy storage system 110 is coupled to the electric load 160 through the by-pass 230, and the second energy storage system 220 is decoupled from the electric load 160.

Figure 2:
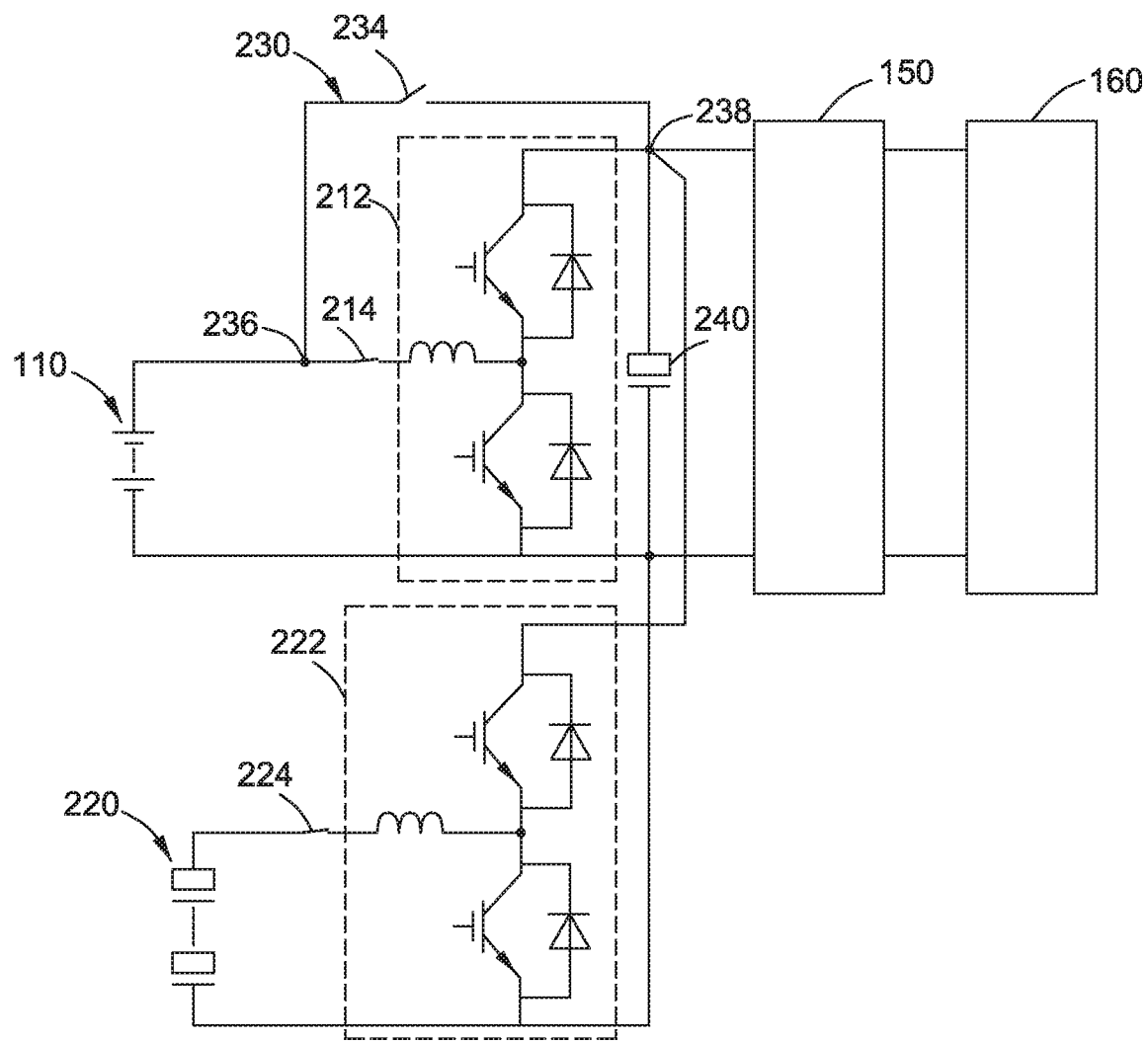
Figure 3:
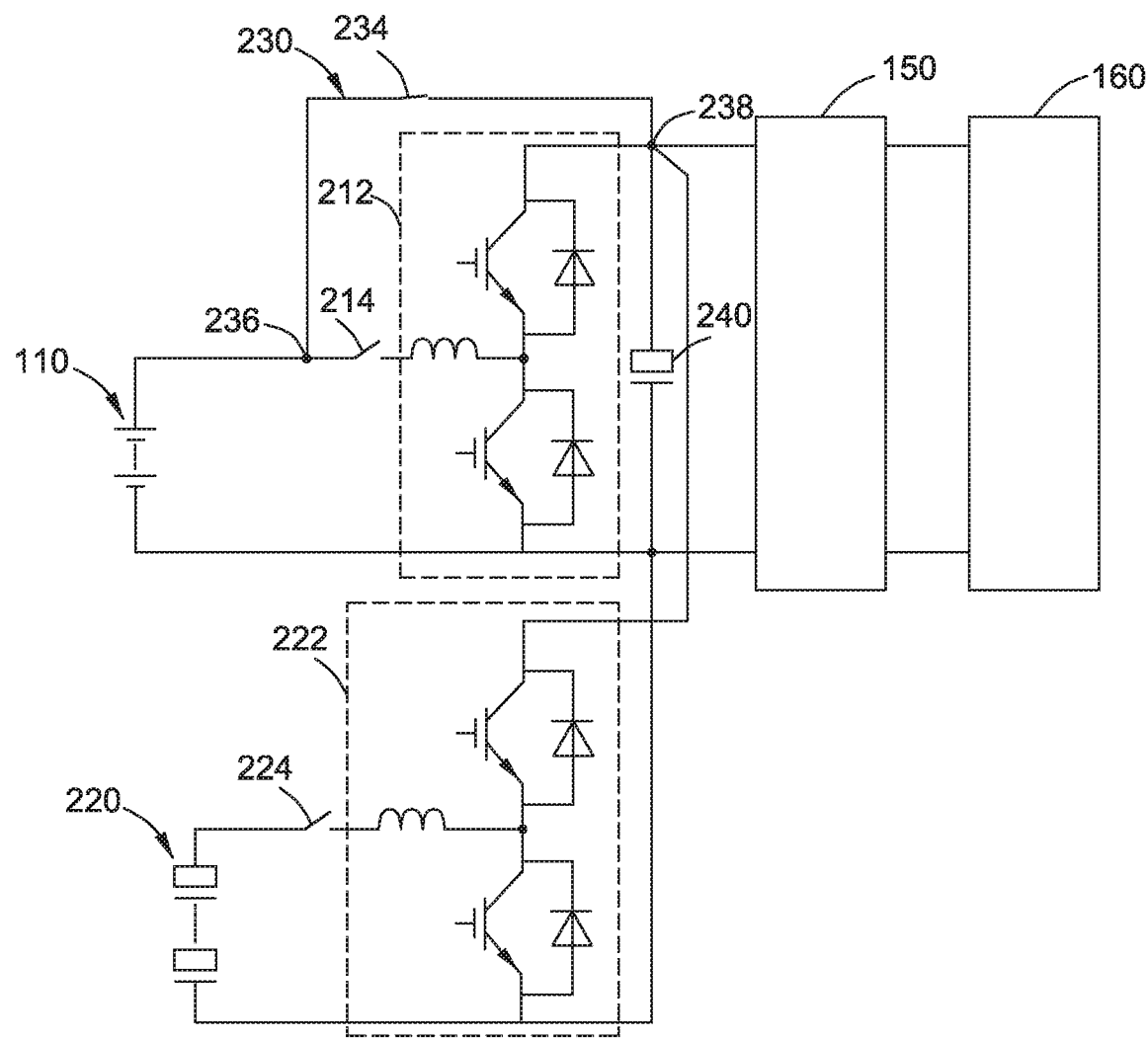

FIGS. 2 and 3 illustrate schematic circuit diagrams of one specific embodiment of the energy storage system 100 in the embodiment as shown in FIG. 1, wherein FIG. 2 illustrates a state in the normal operation mode, FIG. 3 illustrates a state in the fault protection mode.

In the normal operation mode, as shown in FIG. 2, the first and second switch devices 214 and 224 are closed, and the third switch device 234 is opened, the first and second energy storage systems 110 and 220 are coupled to the electric load 160 through the first and second DC-to-DC converters 212 and 222, respectively, to supply power to the electric load 160. In the fault protection mode, as shown in FIG. 3, the first and second switch devices 214 and 224 are opened, and the third switch device 234 is closed, the first energy storage system 110 is coupled to the electric load 160 no longer through the first DC-to-DC converter 212 but through the by-pass 230 to supply power to the electric load 160, and the second energy storage system 220 is decoupled from the electric load 160, not to supply power to the electric load 160.

In addition, in the specific embodiment shown in FIGS. 2 and 3, the energy storage system 100 further comprises a capacitor 240 in parallel with the first energy storage system 110 and the second energy storage system 220 to stabilize the output voltage of the energy storage system 100.

The first energy storage system described herein may be a high energy density storage system, such as a high energy battery (lead-acid battery and so on), an engine generator, a fuel cell, a photovoltaic inverter power supply, and the like. The second energy storage system described herein may be a high power storage system, such as an ultra-capacitor and the like. The switch device described herein may be any form of switch or combinations of any switch elements. The DC-to-DC converter described herein refers to a voltage converter used to convert a constant DC voltage into a variable DC voltage, which generally comprises several functional modules, such as a Pulse Width Modulation (PWM) module, an error amplifier module, a comparator module, and the like.

The range extender in the energy storage system of each embodiment may further comprise one or more parallel energy storage systems in addition to the second energy storage system. For example, in some embodiments, the range extender may further comprise a third energy storage system selectably coupled to the electric load through a third DC-to-DC converter. The third energy storage system may be selected from a group consisting of a fuel cell, a photovoltaic inverter power supply, an engine generator, or combinations thereof.

Figure 4:
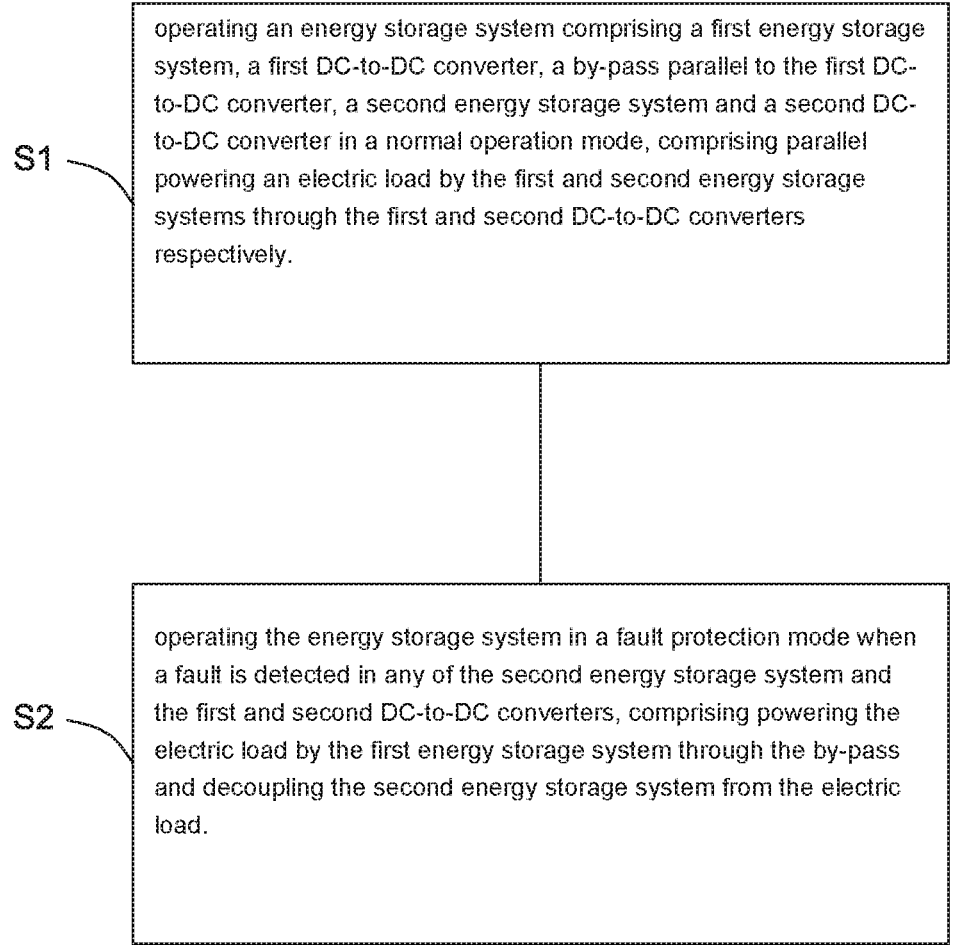
FIG. 4 illustrates a flow chart of a method for supplying power to the electric load using the energy storage system.

Another aspect of embodiments of the present invention relates to an energy management and control method for supplying power to the electric load using the energy storage system. In one specific embodiment, as shown in FIG. 4, the method comprises the following steps:

In step S1, operate an energy storage system comprising a first energy storage system, a first DC-to-DC converter, a by-pass parallel to the first DC-to-DC converter, a second energy storage system and a second DC-to-DC converter in a normal operation mode, comprising parallel powering an electric load by the first and second energy storage systems through the first and second DC-to-DC converters respectively.

In step S2, operate the energy storage system in a fault protection mode when a fault is detected in any of the second energy storage system and the first and second DC-to-DC converters, comprising powering the electric load by the first energy storage system through the by-pass and decoupling the second energy storage system from the electric load.

In some embodiments, in the step S1, the first and second energy storage systems supply average power and dynamic power to the electric load, respectively.

In some embodiments, in the step S2, upon detecting a fault, decouple the second energy storage system from the electric load a period after the electric load is powered by the first energy storage system through the by-pass.

Figure 5:
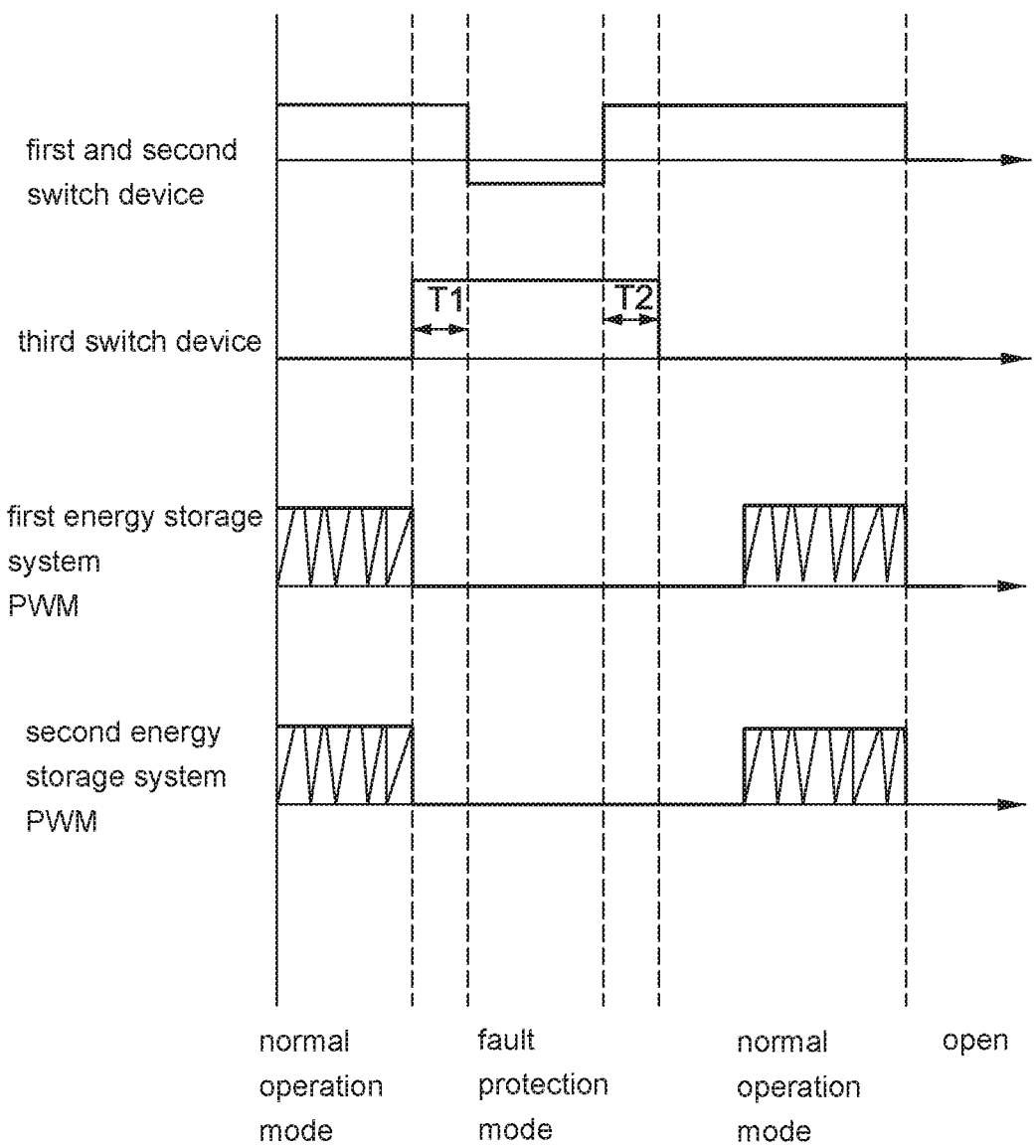
FIG. 5 illustrates the key waveform graphs of the energy storage system in different working modes shown in FIGS. 2 and 3.

In some embodiments, the energy storage system further comprises: a first switch device between the first energy storage system and the first DC-to-DC converter; a second switch device between the second energy storage system and the second DC-to-DC converter; and a third switch device in the by-pass, wherein in the step S1, the first and second switch devices are closed and the third switch device is opened, and in the step S2, the first and second switch devices are opened and the third switch device is closed. In some specific embodiments, in the step S2, as shown in FIG. 5, upon a fault is detected, open the first and second switch devices a period (T1) after the third switch device is closed. In some specific embodiments, the method may further comprise: removing the fault, closing the first and second switch devices, and opening the third switch device a period (T2) after the first and second switch devices are closed. With these operations, the redundancy between the control steps may be improved to ensure that the electric load can operate even if the range extender goes wrong, thereby improving the security.

What is used in the energy management and control method may be any energy storage system in the embodiments described above, which will not be repetitively described herein in details.

In the energy storage system and energy management and control method provided by the embodiments of the present invention, the range extender is provided between the main energy storage system and the electric load to add one or more auxiliary energy storage system to supply energy for the electric load, such as a vehicle driving system, to meet the various power demands of the electric load to enable it to run in different working conditions. Such manner does not need to make large changes to the hardware and software of the entire system. In addition, the energy storage system solves the problem that the electric load may lose power and stop working immediately once the range extender goes wrong, to ensure that the electric load can operate normally even if the range extender goes wrong, thereby improving the security.

Although the present invention has been set forth in details in combination with specific embodiments, the person skilled in the art shall be understood that many modifications and variations may be made to the present invention. Therefore, it should be recognized that the intention of the claims is to cover all these modifications and variations within the real concept and range of the present invention.

What is claimed is:

1. A system, comprising:
a first energy storage system;
a range extender positioned between the first energy storage system and an electric load, the range extender comprising:
a first DC-to-DC converter selectably coupled between the first energy storage system and the electric load;
a second energy storage system;
a second DC-to-DC converter selectably coupled between the second energy storage system and at least one of an output side of the first DC-to-DC converter and an input side of the electric load; and
a by-pass selectably coupled between the first energy storage system and at least one of the output side of the first DC-to-DC converter, an output side of the second DC-to-DC converter, and the input side of the electric load; and
a controller configured to control the first energy storage system and the range extender to work in at least one of a normal operation mode and a fault protection mode, wherein
in the normal operation mode, the first and second energy storage systems are parallel coupled to the electric load through the first and second DC-to-DC converters, respectively; and
in the fault protection mode, the first energy storage system is coupled to the electric load through the by-pass, and the second energy storage system is decoupled from the electric load.

2. The energy storage system according to claim 1, wherein the by-pass links a first point between the first energy storage system and the input side of the first DC-to-DC converter and a second point between the output sides of both the first and second DC-to-DC converters and the input side of the electric load.

3. The energy storage system according to claim 1, wherein the by-pass comprises a switch device.

4. The energy storage system according to claim 1, further comprising:
a first switch device coupled between the first energy storage system and the first DC-to-DC converter;
a second switch device coupled between the second energy storage system and the second DC-to-DC converter; and
a third switch device positioned in the by-pass, wherein;
in the normal operation mode, the first and second switch devices are closed and the third switch device is opened; and
in the fault protection mode, the first and second switch devices are opened and the third switch device is closed.

5. The energy storage system according to claim 1, wherein in the normal operation mode, the first and second energy storage systems are controlled to supply average power and dynamic power to the electric load, respectively.

6. The energy storage system according to claim 1, wherein the first energy storage system comprises a battery.

7. The energy storage system according to claim 1, wherein the first energy storage system comprises an engine generator.

8. The energy storage system according to claim 1, wherein the second energy storage system comprises an ultra-capacitor.

9. The energy storage system according to claim 1, further comprising a third energy storage system selected from the group consisting of a fuel cell, a photovoltaic inverter, an engine generator, and combinations thereof, which is selectably coupled to the electric load through a third DC-to-DC converter.

10. A method, comprising:
operating a system comprising a first energy storage system, a first DC-to-DC converter, a by-pass parallel to the first DC-to-DC converter, a second energy storage system, and a second DC-to-DC converter in a normal operation mode, the normal operation mode comprising parallel powering an electric load by the first and second energy storage systems through the first and second DC-to-DC converters respectively; and
operating the system in a fault protection mode when a fault is detected in any of the second energy storage system and the first and second DC-to-DC converters, the fault protection mode comprising powering the electric load by the first energy storage system through the by-pass and decoupling the second energy storage system from the electric load.

11. The method according to claim 10, wherein the by-pass links a first point between the first energy storage system and an input side of the first DC-to-DC converter and a second point between output sides of both the first and second DC-to-DC converters and an input side of the electric load.

12. The method according to claim 10, wherein the by-pass comprises a switch device.

13. The method according to claim 10, wherein the fault protection mode further comprises decoupling the second energy storage system from the electric load a period after the electric load is powered by the first energy storage system through the by-pass.

14. The method according to claim 10, wherein the energy storage system further comprises:
a first switch device coupled between the first energy storage system and the first DC-to-DC converter;
a second switch device coupled between the second energy storage system and the second DC-to-DC converter; and
a third switch device positioned in the by-pass, wherein;
in the normal operation mode, the first and second switch devices are closed and the third switch device is opened; and
in the fault protection mode, the first and second switch devices are opened and the third switch device is closed.

15. The method according to claim 14, wherein the fault protection mode further comprises opening the first and second switch devices a period after the third switch device is closed.

16. The method according to claim 15, wherein the fault protection mode further comprises:
removing the fault;
closing the first and second switch devices; and
opening the third switch device a period after the first and second switch devices are closed.

17. The method according to claim 10, wherein the normal operation mode further comprises supplying average power and dynamic power to the electric load by the first and second energy storage systems, respectively.

18. The method according to claim 10, wherein the first energy storage system comprises at least one of a battery and an engine generator.

19. The method according to claim 10, wherein the second energy storage system comprises an ultra-capacitor.

* * * * *